United States Patent [19]

Inque

[11] 3,815,115

[45] June 4, 1974

[54] METHOD AND APPARATUS FOR PREPARING DENTAL CEMENTS AND CAVITY-FILLING COMPOSITION

[75] Inventor: Kiyoshi Inque, Tokyo, Japan

[73] Assignee: IJR Inc. (Inoue & Japax Research Inc.), Yokohama, Japan

[22] Filed: Oct. 30, 1972

[21] Appl. No.: 301,999

[30] Foreign Application Priority Data
Oct. 10, 1971  Japan........................46-100578

[52] U.S. Cl............. 340/261, 32/40 A, 259/72, 259/DIG. 20, 340/419, 425/DIG. 11
[51] Int. Cl.................. G08b 21/00, A61c 5/06
[58] Field of Search....... 340/236, 213 Q, 419, 261; 259/DIG. 10, 75, 91, 72; 32/40 A; 73/54, 53; 356/201, 209; 425/DIG. 11

[56] References Cited
UNITED STATES PATENTS

| | | | |
|---|---|---|---|
| 2,286,600 | 6/1942 | Chott | 259/DIG. 20 |
| 3,198,502 | 8/1965 | Thompson | 259/91 |
| 3,553,636 | 1/1971 | Baird | 73/54 |
| 3,719,075 | 3/1973 | Mandrona et al. | 73/54 |
| 3,722,833 | 3/1973 | Inoue et al. | 259/72 |

*Primary Examiner*—John W. Caldwell
*Assistant Examiner*—Glen R. Swann, III
*Attorney, Agent, or Firm*—Karl F. Ross; Herbert Dubno

[57] ABSTRACT

A method of and apparatus for preparing dental cements or cavity-filling compositions (amalgams) where at least two components are combined by vibration, in which a change in the physical properties of the composition within a capsule or receptacle containing measured quantities of the two components to be combined, is continuously monitored and, when a predetermined degree of change is ascertained, a warning signal is generated or further mixing is terminated. The physical property which is continuously monitored may be the viscosity or reflective or transmissive properties of the composition with respect to an incident beam of radiation.

20 Claims, 8 Drawing Figures

PATENTED JUN 4 1974 3,815,115

METHOD AND APPARATUS FOR PREPARING DENTAL CEMENTS AND CAVITY-FILLING COMPOSITION

FIELD OF THE INVENTION

My present invention relates to a method of and apparatus for the preparation of dental cements and cavity-filling compositions and, more particularly, to an adaptive system for the preparation of compositions of two or more components in which the mixing or blending duration strongly influences the ultimate or transient properties of the composition.

BACKGROUND OF THE INVENTION

Various dental-cement compositions and cavity-filling compositions (e.g., amalgams) are produced in the dental laboratory, the dentist's office or a hospital, dispensary or clinic, by the blending of two or more components in carefully measured amounts, to form a viscous product with the desired degree of softness and manipulability and with a desired hardening or setting time and compressive strength.

Typical instances in which such compositions must be created are those in which an amalgam system formed by blending a metal powder with mercury and those in which phosphate cement is produced in known manner from premeasured quantities of two or more components.

It is generally the practice, where contamination of mixing surfaces is to be avoided and where contamination of the product by ambient conditions is a danger, to introduce the two components of settable dental product in a capsule or other receptacle and to vibrate the receptacle until the desired degree of blending has been achieved. These vibrating dental machines may have a vibratable or oscillatable bifurcate arm, the capsule being received by the prongs thereof. The apparatus generally includes a motor, magnetically or mechanically coupled with the vibratile member and a timer, brought into play when the apparatus is started, for turning it off upon the lapse of a predetermined time period which the operator knows from experience or from intuition will yield the desired degree of mixing.

This system has numerous disadvantages which will be detailed below but may be summarized by stating that a given mixing time, even for identical quantities of two components, will seldom yield the same result. The environment (e.g., temperature) and other influences prevent complete reproducibility of the results for any given time. As a consequence, unnecessary operation may have to be carried out, the mixing may have to be terminated prematurely and then continued after testing the composition.

More specifically, it may be stated that hardening dental compositions are generally prepared by an agitating blending or mixing of two or more components which are determined by the nature of the cement to be prepared and its desired properties. The duration of mixing has a significant effect upon the ultimate compressive strength, the bonding characteristics, the handling characteristics, the color and other qualities of the finished cement. In general, the longer the mixing operation, the slower is the setting time. Excessive mixing (agitation or vibration) may make the composition difficult to set. A greater compressive strength and hardness required a shorter mixing time although too short an agitation period may prevent the formation of an homogeneous system.

Other characteristics of such cements also enter into consideration of appropriate mixing time. For example, with certain cements, excessive mixing gives rise to gel destruction and imparts a turbid appearance to the cement.

In systems prior to the use of capsules and vibratile arms of the type described, it was common practice to blend the components of the cement on a slab of a nature unaffected by, and incapable of affecting, the components or the cement using a spatula until a pasty composition was produced which broke with further blending. This system had the disadvantages previously described of contaminating the tools or other materials present in the neighborhood. To an increasing extent, encapsulated components have been provided to avoid such contamination.

While it has already been pointed out that a packaged cement or dental composition, formed by the technician or obtained in a prepackaged state from a factory, has the advantage that contamination is impossible, it is difficult, with such enclosed material, to ascertain the degree of blending and to establish the optimum mixing period. This period is a function, to large measure, of the temperature at which the blending is carried out.

OBJECTS OF THE INVENTION

It is the principal object of the present invention to provide an improved system for mixing settable dental compositions, e.g., dental cements and dental-filling amalgams, whereby the aforementioned disadvantages can be obviated.

It is another object of the invention to provide an improved apparatus for mixing dental cement and amalgams so as to obtain a higher quality product with the desired handling property and without impairing the color, compressive strength and like qualities of the product.

It is yet another object of the invention to provide an improved method of mixing two or more components to form a settable product, especially for dental purposes, which need not rely upon intuition and is less influenced by temperature than has hitherto been the case.

SUMMARY OF THE INVENTION

These objects and others which will become apparent hereinafter are attained, in accordance with the present invention, in a system in which two or more components, adapted to be blended together to form a composition, undergo changes in a physical property to attain a predetermined physical state during the blending operation. The invention provides for substantially continuous monitoring of the change in the physical property of the contents of the receptacle and includes means for generating an output signal adapted to operate an alarm or other warning arrangement when a predetermined threshold level has been reached by the electric signal. Alternatively, or in addition, the electric signal may be employed to disconnect the drive mechanism and halt further vibration of the vibratile member.

Basically, I contemplate monitoring of the contents of the receptacle by the effect of its changing viscosity upon the vibration characteristics of the vibratile member and/or by detecting changes in optical property as determined by reflection and/or transmission of light.

According to a more specific feature of the invention, the mixing apparatus is of the vibratory type and the capsule or other receptacle containing measured quantities of the two components to be comprised, is mounted on the vibratile member which is set into oscillating or vibratory motion by a drive means at a fundamental vibration frequency. The two components may be a metal powder and mercury, together forming an amalgam. The If desired, a mixing pestle can be incorporated in the capsule.

This aspect of this invention is based upon my discovery, that in the course of vibrating the arm carrying the capsule the harmonics or subharmonics of the aforementioned frequency are generated in the vibratile member, e.g., by a tuning-fork-like sympathetic vibration, these harmonics being a function of the viscosity and softness characteristics of the composition formed in the capsule. In other words certain harmonics are generated, and as the composition approaches the predetermined or desired physical property, one harmonic or group of harmonics tend to predominate.

Accordingly, I provide means for sensing the vibration state of the vibratile member, discriminator means, e.g., an electric filter, connected to the sensor and producing an output representing the desired harmonic associated with the attainment of the predetermined physical properties, and circuit means connected to the discriminator means for producing an electric signal when the output of the discriminator means attains a predetermined threshold value. The electric signal is used to trigger a warning and/or to cut off further operation of the mixing means. The warning device may be acoustical or optical.

It has also been found, e.g., in the case of amalgams and dental cement, that the change in physical properties mentioned above is accompanied by a change in the optical characteristics of the composition. The term "optical characteristics" is used herein to refer to the light transmissivity and/or the light reflectivity and, in accordance with the principles of the invention, I train a beam of monochromatic or polychromatic light upon the contents of the receptacle, which may have a transparent or translucent wall, and intercept a beam emerging from the receptacle as a result of reflection or transmission. The output of the sensor, which may be a conventional photo cell, thus has an intensity which is a function of the mixing operation and which can be processed to generate an electric output when a predetermined threshold is attained.

While substantially any type of capsule may be used for the purposes of the present invention it is preferred to employ capsules of the type which have a cap or plug at one end and are generally of cylinder configuration with outwardly convex dome-shaped ends. The capsule may also be of bullet shape or hexagonal cross section.

While the capsule is preferably received by the prongs of a bifurcate vibratile arm, the prongs, engaging the longitudinal ends of the capsule, it has been found to be suitable to employ vibratile arms which engage the capsule at a reduced polygonal cross section central portion thereof. The capsule may be reusable or designed to be discarded after use, may be the receptacle in which the metal alloy and/or mercury are measured, may contain only free space or may have a rupturable diaphragm separating the capsules from one another.

The vibratile arm may be electromagnetically coupled with the energizing system, ie., the arm may be an armature of an electromagnet, or an electric motor may be mechanically connected to this arm. The rotary shaft may be provided with an eccentric weight assisting in imparting energy to the capsule.

The metal alloy and mercury, in premeasured quantities, are mixed together by vibration in the manner described and it is found that with time, the response of the composition to vibration results in the aforementioned harmonics which are superimposed upon the vibration applied to the arm (harmonics) in spite of the fact that the weight of the capsule and its contents remain constant. This progressive change with mixing time is a function of the viscosity of the composition and can be detected by providing a mechanical-electrical transducer, i.e, a piezoelectric crystal, upon the arm. The apparatus thus need be set only to indicate the development of the desired viscosity and the mixing time will be automatically established to yield the desired softness and viscosity independently of the ambient temperature.

In its method aspects, the invention involves the steps of combining in a common receptacle, two or more components adapted to form a hardenable mass and having physical properties which alter with agitation and blending, mixing the two components within the receptacle by vibration or other agitation, monitoring the vibration characteristics and/or the optical characteristics of the mass within the receptacle and generating an electric signal when the physical properties of this mass reach a predetermined state by comparing the electrical signal with a predetermined selected threshold value to operate a warning signal and/or automatically terminate the mixing operation.

DESCRIPTION OF THE DRAWING

The above and other objects, features and advantages of the present invention will become more readily apparent from the following description, reference being made to the accompanying drawing in which.

SPECIFIC DESCRIPTION AND EXAMPLE

Figure 1:
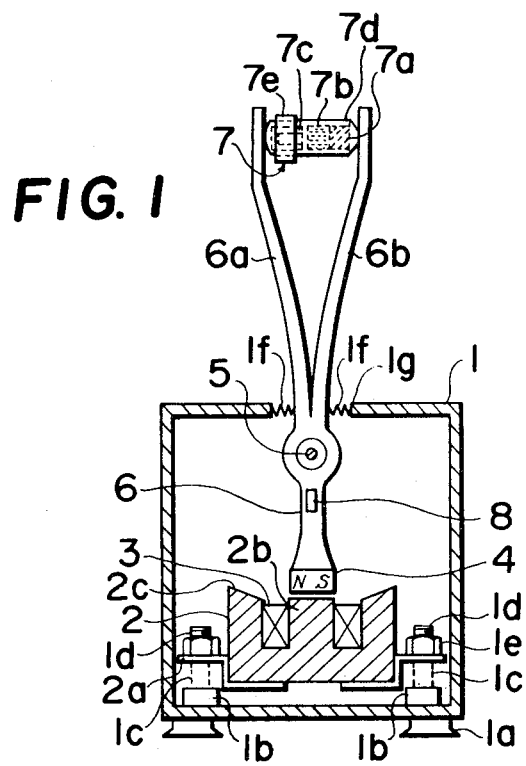
FIG. 1 is a vertical cross-sectional view through an apparatus embodying the present invention.

In FIG. 1, I have shown a housing 1 resting upon pedestals 1a and carrying a fulcrum 5 upon which an arm 6 is oscillatingly mounted for movement parallel to the plane of the paper in FIG. 1.

The housing 1 is formed with respective bosses 1b, each of which supports a coil spring 1c traversed by a bolt 1d receiving nuts 1e which secure the lugs 2a of an electromagnetic core against the coil springs. The electromagnetic core 2 is, consequently, resiliently mounted in the housing to reduce the transfer of vibration to the housing 1. The core 2 is annular and received, about its central post 2b, a ring-shaped electromagnetic coil 3 so that when the coil is energized by alternating current, the annulus 2c surrounding the coil and the central post 2b alternate in magnetic polarity.

The arm 6 carries, close to the center post 2b, a permanent-magnet weight (armature) 4 which is attracted alternately in the clockwise and in the counterclockwise senses upon polarity reversal at the center post. To center the arm 6 yieldably, a pair of compression springs 1f are provided between the housing and a pair of arms 6a and 6b rising divergently through the window 1g formed in the top of the housing. The arm 6a and 6b receive between them a capsule 7 in which the composition is received. The capsule comprises a body 7d onto which a cap 7a is screwed, the V-shaped arrangement of arms 6a and 6b being slightly spread apart to receive the capsule and retain it under the inherent inward restoring force of these outwardly bent legs. The capsule receives measured quantities of mercury 7a, alloy powder or pellets 7b and, possibly a mixing pestle 7c.

The arm 6 carries a sensor 8, i.e., a mechanical-electrical transducer, responsive to vibration of the vibratile member, to air-transmitted disturbances, etc. This sensor may be a strain gauge between parts in the arm, a piezoelectric device of some other construction or a crystal microphone disposed anywhere in the housing. It will be apparent that the sensor will produce an output representing the vibrations of arm 6, not only on the fundamental oscillation frequency produced by the motor 2 – 4, but also harmonics produced within the arm by tuning-fork-like vibration of the prongs as influenced by changes in the viscosity of the mass within the capsule.

Figure 2:
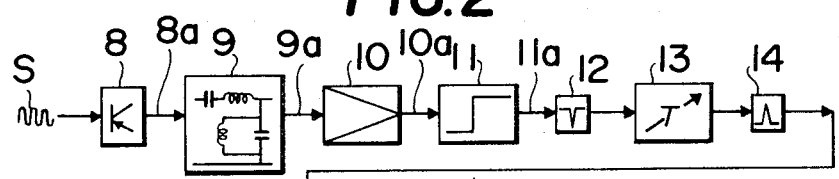
FIG. 2 is a block diagram of the electrical circuitry associated therewith.

As can be seen from FIG. 2, the diagrammatically illustrated vibration sensor 8 receives a signal S in the form of mechanical vibrations and transforms this signal into an electrical output at 8a which is an electrical signal of the fundamental frequency upon which the harmonics are superimposed.

This signal is applied to a discriminator 9, in this case a band-pass filter which selects a frequency previously determined to indicate the development of the predetermined viscosity condition of interest. The discriminator output at 9a is applied to an amplifier 10 whose output is, in turn, supplied at 10a, to a wave shaper 11 of the SCHMITT-trigger type. In this case, a square wave is produced upon detection of the selected frequency. The output from the SCHMITT-trigger 11 is applied to 11a to a differentiator 12 whose output operates a monostable multivibrator 13 having an adjustable time setting as will be apparent hereinafter. The adjustable-time multivibrator is connected, in turn, to a differentiator 14, the output of which is provided to a second monostable multivibrator 15 whose signal is of a duration sufficient to operate an electromagnetic or other relay 17, preferably via an amplifier 16, an indicating lamp 22 being likewise energized when the circuit becomes effective. As can be seen from FIG. 3, the coil 3 of the electromagnet 2 is connected to the electric alternating-current line 18 in series with a momentary-close, normally open pushbutton switch 19, a relay coil 20 and the contacts 21 of the relay 17. A hold contact 20a of relay 20 bridges the pushbutton 19.

In operation, when pushbutton 19 is depressed, the relay 20 is energized through the normally closed contacts 21 and the coil 3 to close contacts 20a. The coil 3 is thus energized until contacts 21 are open.

When the coil 3 is energized, the arm 6 is oscillated in the clockwise and counterclockwise sense about the fulcrum to shake the contents of the capsule 7 and cause mixture and blending thereof. The vibration of vibratile member 6 is sensed as a sonic wave or as a pressure wave by the sensor 8 and transformed into an electrical signal which is applied to the discriminator 9.

On approach to the desired viscosity state, a particular harmonic or band of harmonics may be amplified or augmented. It should be understood that, in some cases, the desired viscosity condition will be associated with the diminution of certain harmonics, elimination of harmonics previously present and/or by the development of harmonics which were not previously present. Depending upon the circumstances, the band-pass filter will deliver an increasing amplitude or decreasing amplitude signal representing approach to the desired viscosity condition.

As the arm 6 oscillates about its fulcrum 5 to agitate the contents of the capsule 7, initiating mixture of the contents of this capsule, the viscosity change varies the inertia of the capsule to influence the movement of the ends of the arm in which the capsule is received and since the arm has only finite stiffness, harmonic vibration is established therein. The output of the piezoelectric sensor 8, therefore, contains frequency components (harmonics) which are characteristic of the changing state within the capsule as well as a fundamental-frequency component representing the oscillation of the arm as induced by the motor 2, 3, 4.

This output signal, containing a number of frequency components as noted, is applied to the discriminator 9 which passes only the harmonic or harmonics of small band width associated with the change of state within the capsule 7.

The signal is amplified at 10 and applied to the wave shaper, i.e., the SCHMITT-trigger 11, which builds up a square wave until a threshold is reached. As the threshold is attained, a signal is applied to the differentiator 12, thereby forming a sharp pulse or spike which triggers the monostable multivibrator 13 having an adjustable delay as represented diagrammatically in FIG. 2.

After the lapse of the predetermined but selected delay interval of say 0 to 5 seconds, the monostable multivibrator switches state to apply a pulse through a differentiator network 14 to the next monostabile multivibrator 15 which produces an output signal of a duration sufficient to operate, via amplifier 16, the lamp 22 or the relay 17.

When the relay 17 is operated, contacts 21 are opened to deenergize the coil 3 and the hold relay 20 whose contacts 20a likewise open. Should the relay 17 fail, the operator need simply depress the manually closed push-button switch 19a in series with the light-voltage source 18 upon noting the illumination of lamp 22.

Figure 3:
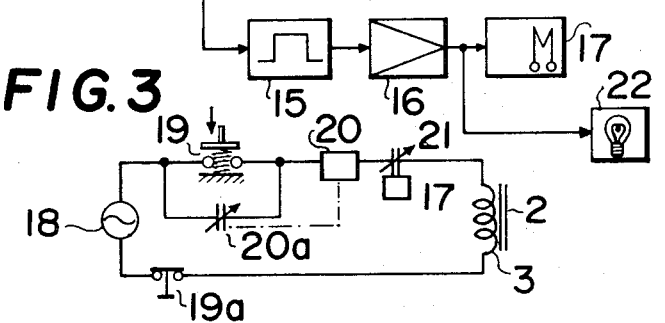
FIG. 3 is a schematic diagram of a power circuit operated by the circuit of FIG. 2.

In the circuit of FIG. 3, various hold arrangements may be employed. For example, the warning lamp or buzzer may be energized directly from the relay 17, the relay 17 may be of the self-holding type and the push button 19 can be a snap switch which must be shifted into its alternative position in response to the warning signal when the system is to be cut off.

The timer 13, which may have an adjustable delay between 0 and 5 seconds, is intended to enable a specific viscosity condition to serve as the initiating or enabling instant for the output signal and affording the individual operator the possibility of altering the softness properties of the adhesive to a degree determined by the timer setting.

The vibrating arm may include an elongated vibratile member or rocker lying in a horizontal plane (see FIG. 6) in which the fulcrum 30 is formed at one end of the arm while the bifurcated free end is adapted to retain a capsule 31. The latter is shown to have a membrane 32 which is rupturable by a pestle 33 within the capsule to allow the two components on opposite sides of the membrane to merge and blend together. A screw 34 may be used to lock the disposable capsule in place until mixing is completed and the contents of the capsule may be made available by rupturing the outer shell.

The vibratile or oscillating motion of the rocker is effected by an electric motor 35 whose shaft 36 is coupled with a crank 37 which, in turn, is articulated by a pin 38 to a rod 39. The latter is attached to the rocker by a damper spring 40 and the crank 37 may carry an unbalancing weight 41 to increase the energy of the throw. Damping springs 42 may also be provided between the housing 43 and the arm.

Figure 5:
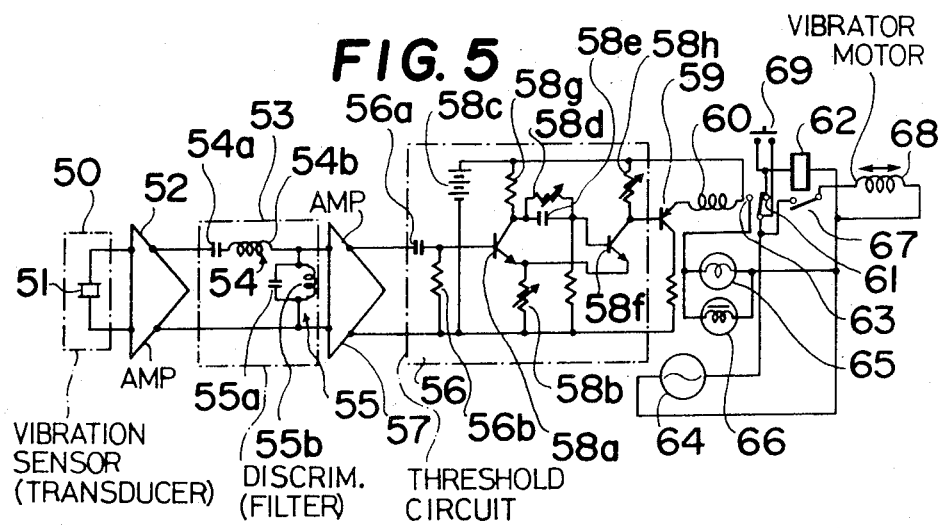
FIG. 5 is a circuit diagram of a system similar to that of FIG. 2 but showing the signal-producing networks in greater detail.

In FIG. 5, we have shown a simplified version of the circuitry for a system responding to vibration as described in connection with FIGS. 1 and 6. In this case, the vibratile sensor 50 is shown to include crystal microphone 51 whose output is applied to the conventional amplifier 52. The band pass filter or discriminator 53 is shown to include a series-resonant tuned network 54 consisting of a capacitor 54a and a coil 54b, while a parallel-resonant network 55 includes a capacitor 55a and an inductor 55b. The amplifier 52 may be any of those described at pages 130 ff., of PULSE, DIGITAL AND SWITCHING WAVEFORMS, McGraw-Hill Book Company, New York, 1965. The band-pass filter may be designed in accordance with the principles set forth at pages 58 ff., of TRANSIENTS AND WAVEFORMS, U. S. Government Printing Office, Washington, D. C., 1951 (see also pages 148 ff., of FUNDAMENTALS OF ELECTRONICS, U. S. Government Printing Office, Washington, D. C., 1953.

The discriminator output is applied to a differentiator network 56 including a capacitor 46a and a resistor 56b through, if desired another amplifier 57. The differentiator support operates as described in the aforementioned publication TRANSIENTS AND WAVEFORMS, pages 65 ff. The output voltage, across the resistor 56b is applied to the base of a resistor 58a of a SCHMITT trigger network which operates in accordance with the principles set forth at pages 389 ff., of PULSE, DIGITAL AND SWITCHING WAVEFORMS.

The SCHMITT trigger includes a variable resistor 58b connected between the emitter of the NPN transistor 58a and the negative terminal of a DC source 58c while the parallel time-constant network of a variable resistor 58d and a capacitor 58e connect the collector of this transistor to the base of a further NPN transistor 58f. Bias resistors 58g and 58h are also provided for these SCHMITT-trigger transistors. The output of the SCHMITT trigger is applied to the base of NPN transistor 59 in circuit with the coil of a relay 60. The relay 60 has a normally closed contact 61 in series with the coil of a relay 62 and a normally open contact 63 in series with the light-current source 64, a warning lamp 65 and a warning bell or buzzer 66. The contact 67 of relay 62 is normally open and is in series with the vibrator motor 68 and the source 64. In this embodiment, which operates somewhat more simply than the system of FIG. 2, the SCHMITT trigger constitutes the threshold device and is triggered with a time delay adjusted at resistor 58d when the threshold set at resistor is attained. The transistor 59 is then rendered conductive to open contact 61 and close contact 63, disconnecting the motor 68 and energizing the warning system. A switch 69 may be normally closed momentarily to turn on the motor.

Figure 6:
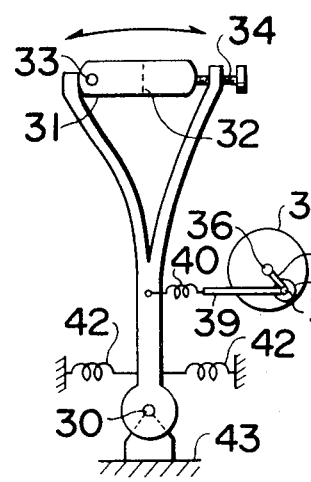
FIG. 6 is a fragmentary elevational view illustrating another drive system for the vibrating arm according to the invention.

A specific example of the system of FIGS. 1 through 3 using the motor drive of FIG. 6, follows:

A capsule as shown in FIG. 6 is filled with 0.33 gram of silver/tin alloy powder of approximately spherical particle configuration and 0.29 gram of mercury. The motor 35 is rotated at 3,000 RPM to vibrate the capsule with a corresponding oscillation frequency. The atmospheric disturbance produced by the arm is detected by a crystal microphone 51 provided on the vibrating rocker. The amplified output contains frequency components of 1.7 kHz to 1.8 kHz having a band width of 0.5 kHz and harmonics of about 1, 3 and 4 kHz. During mixing, the frequency spectrum varied materially and, when a frequency component of about 1.2 kHz appeared intense, operation of the device was terminated automatically as described. The process was carried out at temperatures of 15°C, 20°C, and 30°C and in each case, the blending was ended when the aforementioned critical frequency component was detected. The amalgam was found to be of identical softness in all three cases and the softness was found to be optimum for use in filling dental cavities.

Figure 4:
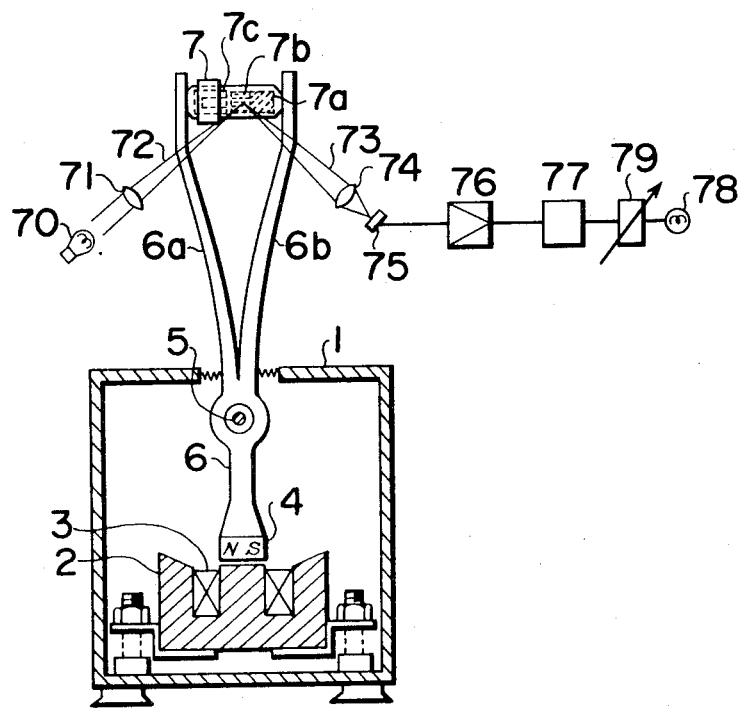
FIG. 4 is a view similar to FIG. 1 but illustrating another embodiment of the invention.
Figure 7:
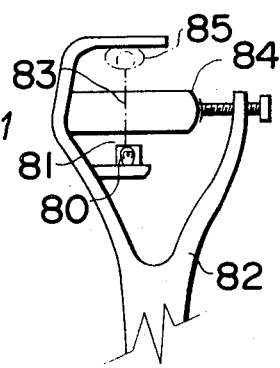
FIG. 7 is a view similar to FIG. 6 showing another sensor arrangement.
Figure 8:
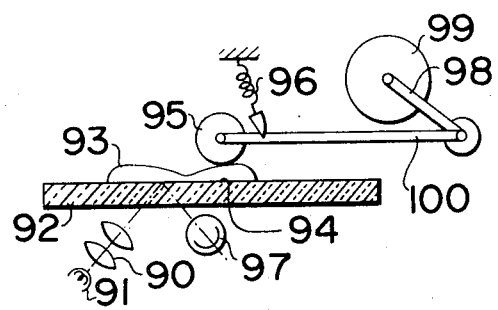
FIG. 8 is a cross-sectional view, partly in diagrammatical form illustrating another aspect of the invention.

In FIGS. 4, 7 and 8, other principles of the present invention are illustrated.

In FIG. 4, for example, there is shown an arrangement in which the rocker arm 6 is pivoted on a fulcrum 5 in a housing 1 and is driven by energization of a coil 3 set into a annular core 2 and magnetically interacting with an armature 4 on the arm 6, all as described in connection with FIG. 1.

Here too a capsule 7, containing the mercury 7a, the metal alloy 7b and a mixing pestle 7c, is received by the prongs 6a and 6b of the arm 6. The capsule is transparent and a source of radiation represented by a lamp 70 and a lens 71 is positioned to deliver a beam 72 of radiation, i.e., visible light, into the capsule. The reflected beam 73 is collected by a lens 74, representing an appropriate optical system, and directed onto a photocell 75, a photoconductor or some other radiation-responsive member. The output of the sensor 75 is applied to an amplifier 76 of the type previously described and to a comparator 77, forming a discriminator which compares the intensity of the reflected light with a preset threshold and then operates a warning signal 78 or the relay 17 illustrated in FIG. 3 to terminate the operation of motor 2–4 as discussed earlier.

When the coil 3 is energized with alternating current, the movable armature 4 oscillates to the right and left, causing the arms 6a and 6b of member 6 to oscillate correspondingly at the frequency of energization of the coil. The bifurcated rocker 6 vibrates at the prongs 6a and 6b as do the legs of a tuning fork and a capsule vibration is applied to agitate the contents of the capsule. The amalgam in the capsule undergoes physical change in luster and reflectivity during amalgamation and the progressive loss of brightness of the alloy results in a diminution in the output detected by the sensor 75. This decrease in amplitude, when it reaches a predetermined minimum threshold level, operates to terminate further vibration or to warn the technician. A time-delay network represented at 79 may be interposed between the threshold support and the output circuit 78.

The system illustrated in FIG. 4 has been found to be advantageous also in the preparation of phosphate, silicate and other dental cements by monitoring the reflected light.

Another embodiment of the invention has been illustrated in FIG. 7 in which the light source is a lamp 80 associated with a lens 81 and carried directly upon the arms of the rocker 82. In this case, the light beam is trained at 83 through the capsule 84 and is detected by a photocell 85 on the opposite side of the capsule. The circuit of FIG. 4 is used here as well and the sole difference is that transmitted light serves as the sensing means.

In FIG. 8, there has been shown still another modification in which a beam of light is trained by a lens system 90 and a lamp 91 through a transparent supporting plate 92 upon a flexible receptacle 93 containing the prepackaged ingredients of the dental cement, separated by a membrane 94 within the capsule. As a roller 95 is reciprocated across the flexible receptacle 93 and is urged thereagainst by a compression spring 96, the two components mix and the change in the reflective properties of the light beam intercepted by the photocell 97 can be detected. In this embodiment the roller 95 is reciprocated by the crank 98 of a motor 99 via a connecting rod 100.

I claim:

1. A method of making a settable composition having a predetermined physical property by intimately mixing predetermined quantities of at least two components whereby the characteristics of the composition change until said predetermined property is reached, said method comprising the steps of:
   a. mixing said predetermined components for a period sufficient to blend them together to constitute said composition;
   b. continuously and automatically monitoring said change in the characteristics of said composition during the mixing of said components; and
   c. generating an electrical signal upon detection of the development of said physical property.

2. The method defined in claim 1, further comprising the step of automatically terminating the mixing of said components upon the generation of said signal.

3. The method defined in claim 2, further comprising the step of delaying for a selected predetermined period the termination of the mixing of said components subsequent to the generation of said signal.

4. The method defined in claim 1, further comprising the step of producing an operator-alerting warning with said signal.

5. The method defined in claim 1 wherein said predetermined quantities of said two components are introduced into a capsule and said components are mixed in step (a) by vibrating said capsule upon a vibratile arm.

6. The method defined in claim 5 wherein the characteristic monitored in step (b) is the viscosity of said composition, said method further comprising the step of generating an output signal representing a fundamental characteristic of vibration imparted to said arm from an external source and at least one harmonic of a frequency characteristic of the viscosity of said composition; electronically filtering the last-mentioned signal to produce an electrical output characteristic of the viscosity of said composition and generating said electrical signal upon said electrical output attaining a predetermined value.

7. The method defined in claim 5 wherein said physical property is the optical opacity of said composition, said method further comprising the steps of:
   directing a beam of radiation into said capsule;
   detecting the optical intensity of said beam upon its passage through said capsule; and
   generating said electrical signal upon the detected intensity attaining a predetermined threshold value.

8. The method defined in claim 5 wherein said physical property is the light reflectivity of said composition, said method further comprising the steps of:
   training a beam of light upon said composition in said capsule;
   intercepting reflected light from said composition in said capsule;
   generating an electrical output representing the intensity of the reflected light; and
   producing said electrical signal upon said output attaining a predetermined threshold value.

9. The method defined in claim 1 wherein said composition is a dental cement.

10. The method defined in claim 1 wherein said composition is a dental amalgam for the filling of tooth cavities.

11. An apparatus for preparing a dental composition comprising:
   a receptacle for selected predetermined quantities of at least two components adapted to be blended together to form a settable composition and characterized by the development of a predetermined physical property during blending;
   agitating means engageable with said receptacle for blending said components together therein to form said composition and induce physical change within said receptacle;
   a sensor responsive to progressive physical change in said composition within said receptacle; and
   circuit means connected to said sensor for generating and electrical signal upon the attainment of said predetermined physical property as detected by said sensor.

12. The apparatus defined in claim 11, further comprising means responsive to said signal for terminating the blending of said components within said receptacle.

13. The apparatus defined in claim 11, further comprising operator-alerting means controlled by said signal for indicating the attainment of said predetermined physical property.

14. The apparatus defined in claim 11 where in said physical property is an optical property of said composition, said apparatus including means for directing a beam of light into said receptacle containing said composition, said sensor intercepting light from said composition, said circuit means including a discriminator monitoring the output of said sensor with respect to a predetermined threshold value, and means for generating said electrical signal connected to said discriminator means for producing said electrical signal upon said output attaining said predetermined threshold value.

15. The apparatus defined in claim 14 wherein said means for directing said beam into said receptacle and said sensor are disposed on opposite sides of said receptacle and said optical property is the light transmissivity of said composition.

16. The apparatus defined in claim 14 wherein said sensor intercepts light reflected from said composition in said receptacle and said optical property is the light reflectivity of said composition.

17. The apparatus defined in claim 11 wherein said physical property is the viscosity of said composition, said means engageable with said receptacle including a vibratile member and means for vibrating said member, said sensor being disposed in the region of said member for producing an output representing vibrational characteristics imparted to said member by said composition in said receptacle, said circuit means including a discriminator responsive to a component of said output constituting a function of the viscosity of said composition.

18. The apparatus defined in claim 11, further comprising timer means connected to said circuit means for delaying the generation of said electrical signal for a predetermined selected period following attainment of said predetermined property.

19. The apparatus defined in claim 11 wherein said receptacle is a capsule, said agitating means including a vibratable arm receiving said capsule, and means for oscillating said arm.

20. The apparatus defined in claim 19, further comprising means for generating a warning signal in response to said electrical signal and means energized by said electrical signal for deactivating said means for oscillating said arm.

* * * * *